United States Patent [19]

Khasin et al.

[11] Patent Number: 5,424,147
[45] Date of Patent: Jun. 13, 1995

[54] WATER-ACTIVATED BATTERY

[75] Inventors: Eric Khasin, Rishon LeZion; Jonathan Goldstein; Neal Naimer, both of Jerusalem; Binyamin Koretz, Efrat, all of Israel

[73] Assignee: Electric Fuel (E.F.L.) Ltd., Jerusalem, Israel

[21] Appl. No.: 275,586

[22] Filed: Jul. 15, 1994

[51] Int. Cl.⁶ .............................................. H01M 6/34
[52] U.S. Cl. ................................... 429/119; 429/220; 429/233; 29/623.5
[58] Field of Search ................ 429/118, 119, 220, 233; 29/2, 623.5

[56] References Cited

U.S. PATENT DOCUMENTS

| | | | |
|---|---|---|---|
| 3,009,978 | 11/1961 | Corren | 29/2 |
| 3,205,096 | 9/1965 | Honer . | |
| 3,354,395 | 11/1967 | Merck et al. | 429/119 |
| 3,502,508 | 3/1970 | Honer . | |
| 4,094,028 | 6/1978 | Fujiyama et al. | 9/321 |
| 4,261,853 | 4/1981 | Koontz et al. | 429/220 |

Primary Examiner—Stephen Kalafut
Assistant Examiner—Carol Chaney
Attorney, Agent, or Firm—Helfgott & Karas

[57] ABSTRACT

The invention provides a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame, the cathode material being formed of cuprous chloride, sulfur, carbon and a water-ionizable salt and being compacted and fused under pressure and heat to itself and to the skeletal frame, to form a heat-fused, conductive, electrochemically active phase; at least one cavity separating the cathode and the at least one anode, and at least one aperture leading to the at least one cavity for the ingress of an electrolyte-forming, aqueous liquid.

17 Claims, 1 Drawing Sheet

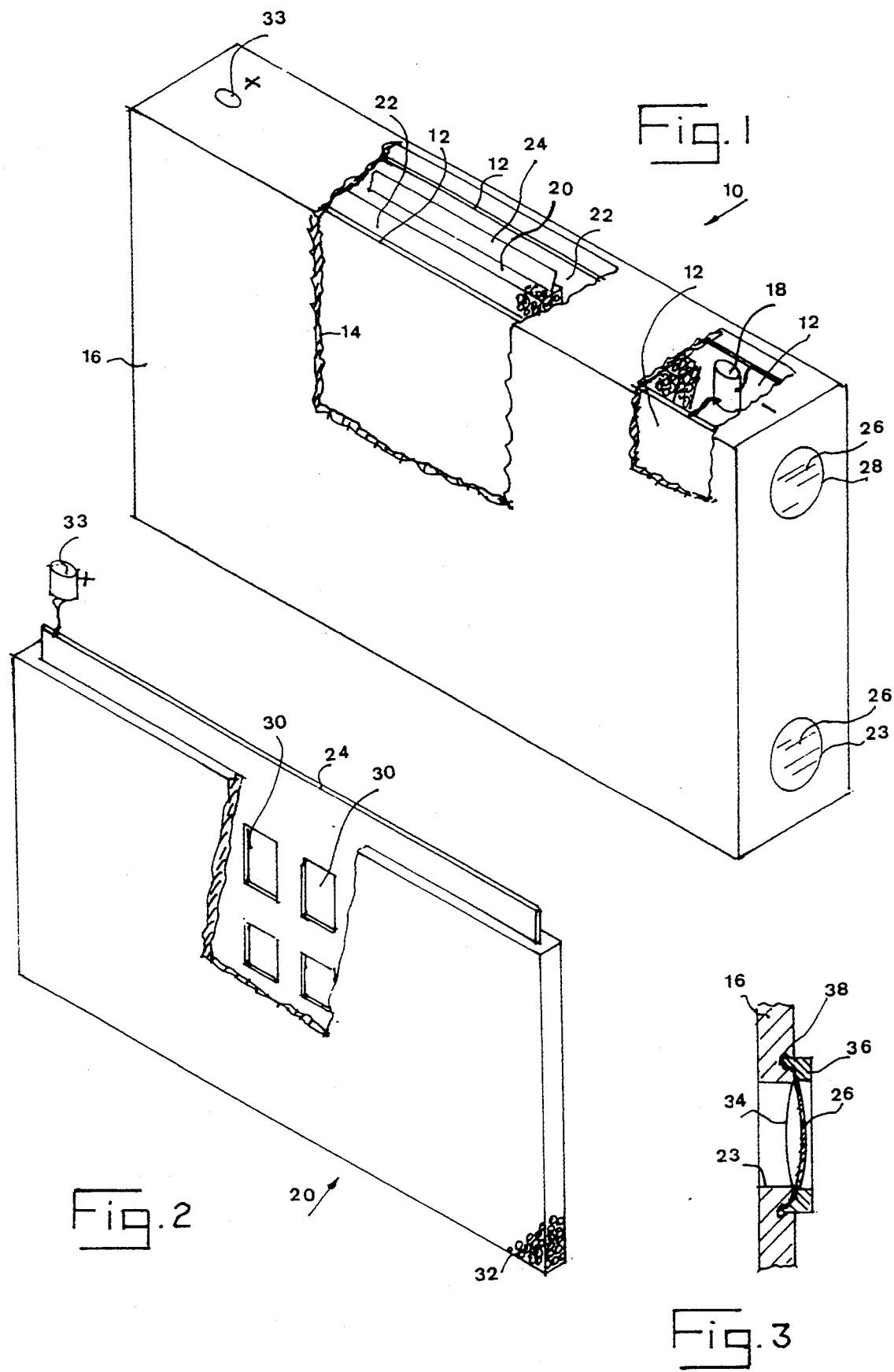

WATER-ACTIVATED BATTERY

The present invention relates to water-activated, deferred-action batteries and to a method for producing a cathode therefor.

More particularly the present invention relates to a deferred-action battery which is adapted to be activated by being immersed in water.

Deferred-action batteries have been known for decades, and various embodiments of such batteries and methods for the production and use thereof, as well as for the manufacture of component parts therefor, have been described, e.g., in U.S. Pat. Nos. 2,491,640; 2,636,060; 2,655,551; 2,658,935; 2,716,671; 2,817,697; 3,343,988; 3,859,136; 3,953,238; 4,016,339; 4,192,913; 4,261,853; 4,332,864; 4,368,167; 4,487,821; 4,803,135; and 4,822,698.

As described, e.g., in U.S. Pat. No. 2,491,640, batteries of this type are intended especially for use in operating an emergency signal at sea. The signal may be a light to indicate the presence of a person who has become stranded by shipwreck or other causes. It may also be an electronic apparatus floating on the water and emitting a signal which can be detected at a distant point. The battery is adapted to energize the signal and to be activated by immersion in water, which may be the fresh water of an inland lake or river, or the salt water of the ocean.

These batteries basically comprise an anode (usually a magnesium alloy) and a cathode (traditionally a silver or copper halide), wherein the initiation of discharge is by immersion in seawater, which serves as a conducting electrolyte between the anode and the cathode.

Most of the older patents relating to batteries of this type describe the use of cathodes based on cuprous chloride, while more recent patents such as U.S. Pat. No. 4,192,913 and 4,261,853 describe cathodes based on cuprous thiocyanate.

All of said patents, however, emphasize cold pressing or unpressed setting/molding of the cathode mix, as described, e.g., in column 2 and in claim 1 of U.S. Pat. No. 4,368,167.

In accordance with the present invention, it has now been discovered that a higher operating voltage per cell, giving a higher light intensity for a given signal light configuration, is achieved by hot pressing the cathode mix onto a current-collecting screen at a temperature of about 140°–170° C. to form said mix into a heat-fused conductive electrochemically active phase.

Thus the present invention provides a water-activated, deferred-action battery having a housing containing at least one cell, comprising (a) at least one anode selected from the group consisting of magnesium, aluminum, zinc and alloys thereof; (b) a cathode, comprising a skeletal frame including conductive metal and having a portion of its surface area formed as open spaces, and further comprising a heat-pressed, rigid static bed of active cathode material encompassing said skeletal frame, said cathode material being formed of cuprous chloride, sulfur, carbon and a water-ionizable salt, and being compacted and fused under pressure and heat to itself and to the skeletal frame, to form a heat-fused, conductive, electrochemically active phase; (c) at least one cavity separating said cathode and said at least one anode; and (d) at least one aperture leading to said at least one cavity, for the ingress of an electrolyte-forming, aqueous liquid.

In preferred embodiments of the present invention, said cell will comprise two anodes as defined above, flanking a central cathode as defined above, and said cavity may optionally further comprise separator layers made, e.g., of conventional battery separator materials such as non-woven polyamine, woven polypropylene, etc., or from a water-soluble film, such as that based on polyvinyl alcohol or polyacrylamide, which is fast-dissolving on activation through immersion in water.

The invention also provides a method for producing a cathode for a water-activated, deferred-action battery, comprising (a) forming from an electrically-conductive metal a skeletal form having some open spaces; (b) preparing a cathode mix comprising a blended mixture of cuprous chloride, sulfur, carbon and a water-ionizable salt; (c) heating said mixture while stirring at a temperature effective to melt said sulfur; (d) cooling and chopping said mixture into particulate form; (e) introducing said skeletal frame into a compaction die with said chopped mixture surrounding said frame; (f) heating said die to a temperature of about 140° C. to 170° C.; and (g) compacting said heated mixture under pressure in said die, whereby the compacting of the particles under heat and pressure fuse said particles to each other and to the skeletal frame, to form a conductive, electrochemically-active, fused, rigid static bed of active cathode material encompassing said skeletal frame.

Said skeletal frame can be of different forms, and preferably is selected from the group consisting of perforated sheet metal, expanded metal mesh, flattened expanded metal mesh and woven metal mesh.

As is known in the prior art concerning deferred batteries, the activating electrolyte most simply enters between the cathode and anode through an aperture or holes in the battery case, and according to aviation and nautical requirements for such signal lights, the battery must be automatically activated within 60 seconds of immersion in the sea, which acts as the electrolyte for the batteries. Mechanically removable plugs (to be removed by the survivor in order to activate the battery) covering the holes are not allowed by some aviation regulatory bodies, yet leaving the holes open enhances chemical degradation, passivation or oxidation of the plates during storage through untimely ingress of impurities such as moisture, acid gases, etc., thereby giving unacceptable shelf-life/or activation performance.

In a further aspect of the present invention, a further improved battery having longer shelf life and improved performance is achieved by covering the holes with a water-soluble film, such as that based on polyvinyl alcohol or polyacrylamide, which is fast-dissolving on activation through immersion in water.

In a preferred embodiment for exceptionally long shelf-life, the film is a double layer, comprising an outer soluble layer supporting a thin, inner, water-resistant layer which prevents the permeation of water vapour through said sealed aperture during storage (based, for example, on polytrifluorochloroethylene, polypropylene or PVDF). On activation, the main layer immediately dissolves, and the thin, water-resistant layer that it supported is ruptured.

In yet a further aspect of the present invention, there is provided a deferred-action battery especially adapted for use not only in seawater, but also in fresh water, e.g., for life jackets on planes travelling mainly inland routes. As is known, cell start-up and performance with normally seawater-activated reserve batteries is inhibited in fresh water, due to poor electrolyte conductivity. An unmodified cathode gives an unacceptable performance for the intended application (signal light), since the required minimum light intensity is not delivered over the required period of several hours. An obvious step is to include regular salt (i.e., sodium chloride) in the cathode mix, which would dissolve in the fresh water and improve conductivity.

However, regular salt is very soluble, and since the electrolyte is under constant replenishment from the body of water surrounding the cell, it would rapidly be leached out from the cathode during, for example, long wet stand activation before current delivery. Thus, in embodiments of the present invention, said water-ionizable salt is a sparingly soluble salt having a solubility in water of less than 50 gm/liter, which will gradually dissolve and maintain the conductivity over the required illumination time. As an example, instead of, or supplementing, NaCl in the cathode (solubility in water 370 gm/liter), $CaSO_4$ can be used (solubility 2 gm/liter).

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in, the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective, fragmented view of a preferred embodiment of the battery according to the invention;

FIG. 2 is a perspective, fragmented view of the cathode; and

FIG. 3 is a detailed, cross-sectional view of a further embodiment of one of the apertures.

There is seen in FIG. 1 a water-activated, deferred-action battery 10 having a single cell. Two spaced-apart anodes 12 are shown, each having the form of a thin plate. Anodes 12 are made of a metal selected from the group comprising magnesium, aluminum, zinc, and alloys thereof. Particularly preferred is a magnesium alloy.

Each anode 12 is held in parallel, adjacent relationship to a major inner face 14 of a plastic battery housing 16. Both anodes 12 are connected in parallel to a negative terminal 18, accessible from outside housing 16.

A cathode plate 20, thicker than but having about the same area as the anodes 12, is positioned between the anodes 12. A cavity 22 containing air and, optionally, separator layers (not shown) remains between the cathode plate 20 and each anode 12, and thus electrically insulates cathode 20 from anode 12 while battery 10 is in its inactivated state. Two apertures 23, 28 are shown, both leading to the cavity 22. The aperture 23 has its inlet at the base of the housing 16, and serves for the ingress of an electrolyte-forming aqueous liquid. The aperture 25 has its outlet near the top of the housing 16 and serves to allow air to escape as liquid enters the battery to start power-producing operation; it also allows the escape of hydrogen subsequently evolved during operation. In a preferred embodiment, the higher aperture is located on an opposite surface of housing 16.

Both apertures 23, 28 are advantageously sealed by a water soluble film 26 to protect the battery before use and to extend its shelf-life. On activation, the battery 10 is in contact with water, the film 26 dissolves in less than one minute, water enters the cavities 22 and the battery starts producing electric power. The water-soluble film 26 may suitably be formed of a polymer such as polyvinyl alcohol or polyacrylamide.

As seen more clearly in FIG. 2, the cathode plate 20 comprises a skeletal frame 24 including conductive metal and having a portion of its surface area formed as open spaces 30. The main bulk of the cathode plate 20 comprises a heat-pressed, rigid, static bed 32 of active cathode material encompassing the skeletal frame 24.

The active cathode material is formed of cuprous chloride, sulfur, carbon and a water-ionizable salt. Said carbon may suitably be graphite or carbon black; the latter is preferred.

In order to prevent leaching-out of said salt during battery activation such as would occur with the use of sodium chloride, with consequent loss of electrolyte conductivity when the battery is immersed in lake or fresh river water, the water-ionizable salt is selected to be only sparingly soluble in water, advantageously to have a solubility in ambient temperature water of less than 50 gm/liter. A suitable salt is $CaSO_4$, used either alone or supplementary to sodium chloride.

Referring now to FIG. 2, the cathode plate 20 previously described above is seen in further detail. The cathode plate 20 is compacted and fused under pressure and heat to itself and to the skeletal frame 24, to form a heat-fused, conductive, electrochemically-active phase. As with many sintering operations, the strength of the produced form can be improved by the adding of a suitable binder material; advantageously, fluorinated ethylene propylene and/or kaolinscan be added to act as a supplementary binder. The skeletal frame 24 is electrically connected to a positive terminal 33 which is accessible from outside the housing 16.

FIG. 3 shows a further embodiment of the aperture 23. The water soluble film 26 is provided with a thin, inner water-resistant layer 34 which prevents the permeation of water vapour through the sealed aperture 23, thereby further prolonging the battery shelf life. On immersion of the battery in water and the consequent dissolution of the film 26, the mechanically-weak layer 34 collapses, water enters the cavities 22, and the battery starts producing electric power.

The layer 34 may suitably be chosen from the following materials: polytrifluorochloroethylene, polypropylene and polyvinyldifluoride. Attachment of the film 26 and the layer 34 to the housing 16 can be achieved by glueing; however, a preferred method is shown, where a plastic retaining ring 36 is pressed into a groove 38 surrounding aperture 23, to clamp the film 26 and the weak layer 34 to the housing 16.

EXAMPLE 1

A cuprous chloride cathode was prepared as follows: Cuprous chloride 133.6 gm (Aldrich), sulfur 34.4 gm (Aldrich), carbon black 12 gm (Cabot), sodium chloride 16 gm (Aldrich), and FEP powder 4 gm (DuPont) were weighed into a Pascal blender and blended for two hours. The homogenous mix was then transferred into a glass beaker on a hot-plate at 160° C. The mix was stirred until the sulfur had melted, and following cooling, the beaker contents were transferred into a coffee grinder and chopped for about a minute. A 20 gm sample of the chopped mix was transferred to a die recess with open area 72.5 mm ×20 mm. First, 10 gm of the mix was poured into the die and leveled, then the cathode current collector (a pre-tabbed copper expanded metal sheet, approximately 20 mesh, obtained from the Exmet Corp.) was laid on this, and the final 10 gm portion of mix added to the die, followed by levelling.

The standard die was then closed with its mating punch section. The die was then heated to 160° C. in a 100 ton press with heated platens (PHI), and the mix pressed at a pressure of 100 MPa for four minutes. After cooling and removing the compact from the die, the cathode was observed to be robust and uniform, of 5.0 mm thickness.

EXAMPLE 2

In order to test the performance of the cathode from Example 1, it was clamped at a uniform spacing of about 1 mm separation between two parallel magnesium anode foils of the alloy type AZ61 (Magnesium Elektron) having a common current takeoff and similar overall area dimensions to the cathode and a thickness of 1 mm. The plate assembly, with one wire proceeding from the common tab of the two magnesium plates out to a signal bulb device, and one wire from the bulb device back to the cathode tab, was immersed into tap water in a 5-liter beaker. The bulb lit immediately, the current in the circuit being 200 mA, and the initial cell potential being 1.75 V. After 12 hours, the required lifetime for this cathode weight, the current was stable and the cell terminal voltage was 1.65 V. The signal bulb device light intensity was measured at this stage and found to be 1.8 candela in the horizontal plane, meeting specified aviation and nautical requirements. When the experiment was repeated using a conventional cuprous chloride cathode of similar weight to the cathode of Example 1, the initial on-load cell voltage was only 1.5 V, falling to 1.4 V after only eight hours, at which time the light intensity from the signal bulb device was an inadequate 0.75 candela in the horizontal plane.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A water-activated, deferred-action battery having a housing containing at least one cell, comprising:
   a) at least one anode selected from the group consisting of magnesium, aluminum, zinc and alloys thereof;
   b) a cathode comprising a skeletal frame including conductive metal and having a portion of its surface area formed as open spaces, and further comprising a heat-pressed, rigid, static bed of active cathode material encompassing said skeletal frame, said cathode material being formed of cuprous chloride, sulfur, carbon and a water-ionizable salt having a solubility in water of at least 2 gm/liter, said material being compacted and fused to itself and to the skeletal frame, to form a heat-fused, conductive, electrochemically active material:
   c) at least one cavity separating said cathode and said at least one anode; and
   d) at least one aperture leading to said at least one cavity for the ingress of an electrolyte-forming, aqueous liquid.

2. A water-activated, deferred-action battery according to claim 1., wherein said aperture is provided in an external wall of said battery housing and is sealed by a water-soluble film.

3. A water-activated, deferred-action battery according to claim 2, wherein said water-soluble film is formed of a polymer selected from the group consisting of polyvinyl alcohol and polyacrylamide.

4. A water-activated, deferred-action battery according to claim 2, wherein said water-soluble film is provided with an inner water-resistant layer which prevents the permeation of water vapor through said sealed aperture, and which collapses upon dissolution of said water soluble film.

5. A water-activated, deferred-action battery according to claim 4, wherein said water-resistant layer is formed of a polymer selected from the group consisting of polytrifluorochloroethylene, polypropylene and polyvinyldifluoride.

6. A water-activated, deferred-action battery according to claim 1, wherein said water-ionizable salt is NaCl.

7. A water-activated, deferred-action battery according to claim 1, wherein said water-ionizable salt is a sparingly soluble salt having a solubility in water of less than 50 gm/liter.

8. A water-activated, deferred-action battery according to claim 7, wherein said aqueous liquid is salty sea water.

9. A water-activated, deferred-action battery according to claim 7, wherein said salt is $CaSO_4$.

10. A water-activated, deferred-action battery according to claim 9, wherein said aqueous liquid is fresh lake water.

11. A water-activated, deferred-action battery according to claim 1, wherein said active cathode material further comprises fluorinated ethylene propylene as a supplementary binder.

12. A water-activated, deferred-action battery according to claim 1, wherein said carbon is selected form the group consisting of graphite and carbon black.

13. A water-activated, deferred-action battery according to claim 1, wherein said carbon is carbon black.

14. A water-activated, deferred-action battery according to claim 1, wherein said anode comprises a magnesium alloy.

15. A water-activated, deferred-action battery according to claim 1, wherein said skeletal frame is formed from a metal selected from a perforated sheet metal, an expanded metal mesh, a flattened expanded metal mesh, or a woven metal mesh.

16. A water-activated, deferred-action battery according to claim 1, wherein said cell comprises two anodes flanking a central cathode, as defined herein.

17. A method for producing a cathode for a water-activated, deferred-action battery, comprising:
   a) forming, from an electrically-conductive metal, a skeletal frame having some open spaces;

b) preparing a cathode mix comprising a blended mixture of cuprous chloride, sulfur, carbon and a water-ionizable salt having a solubility in water of at least 2 gm/liter;

c) heating said mixture while stirring at a temperature effective to melt said sulfur;

d) cooling and chopping said mixture into particulate form;

e) introducing said skeletal frame into a compaction die with said chopped mixture surrounding said frame;

f) heating said die to a temperature of about 140° C. to 170° C.; and g) compacting said heated mixture under pressure in said die, whereby the compacting of the particles fuse said particles to each other and to the skeletal frame to form a conductive, electrochemically active, fused, rigid static bed of active cathode material encompassing said skeletal frame.

* * * * *